Patented Jan. 23, 1940

2,187,813

UNITED STATES PATENT OFFICE 2,187,813

VAT DYESTUFF OF THE PHTHALOYL QUINAZOLINE SERIES

Fritz Baumann and Heinz Werner Schwechten, Leverkusen-I. G. Werk, Germany, assignors to General Aniline Works, Inc., New York, N. Y., a corporation of Delaware No Drawing. Application May 12, 1937, Serial No. 142,197. In Germany May 30, 1936

8 Claims. (Cl. 260—261)

The present invention relates to new vat dyestuffs.

Our new products may be defined as phthaloyl quinazolines which contain at least one substituted amino group attached to a carbon atom of the heterocyclic nucleus. The following formula of a 6.7-phthaloyl quinazoline is illustrative of our products:

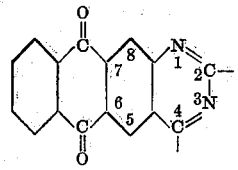

It being understood that either the 2-carbon atom or the 4-carbon atom or both contain a substituted amino group. Examples for the latter are alkyl, aryl, hydroaryl and anthraquinonyl amino groups and amines of higher ring systems such as of dibenzpyrenequinone, anthanthrone or dibenzanthrone. Especially there are employed amines containing a radical of a compound which is capable of being vatted. Preferred compounds are those which contain an aryl residue in 2-position and the amino group in 4-position, and among those such compounds as contain a phenyl group as aryl and an aminoanthraquinone-benzacridone radical in 4-position.

Our new products show yellow and orange to green shades. For the most part they are valuable vat dyestuffs; others may be employed as intermediate products for the manufacture of vat dyestuffs.

The process of manufacture of our new products is by causing amines containing at least one exchangeable hydrogen atom to react upon phthaloyl quinazolines which contain in the heterocyclic nucleus at least one halogen atom linked to a carbon atom. Depending on the nature and the reactivity of the amine employed the reaction may be carried out at temperatures of about 40–200° C., eventually in the presence of suitable diluents such as nitrobenzene, trichlorobenzene or phenol.

The halogen containing phythaloyl quinazolines serving as starting materials may be prepared in the manner illustrated by the following equation:

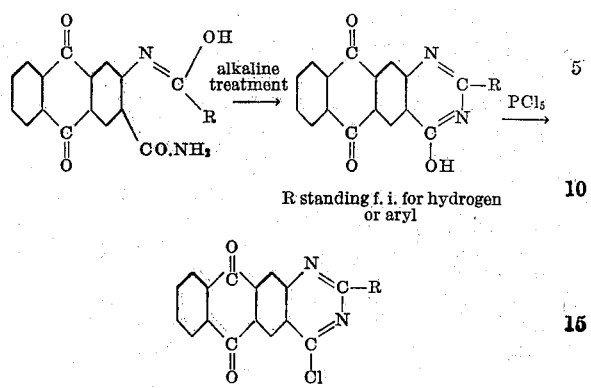

R standing f. i. for hydrogen or aryl

The acylamino body is shown in the tautomeric (enolic) form.

In many cases the 4-chloro-phthaloyl quinazolines may be directly obtained from the acylamino body by mere treatment with thionylchlorine or phosphorus pentachloride. The halogen containing phthaloyl quinazolines represent weakly yellow substances.

The following examples illustrate the invention without, however, restricting it thereto, the parts being by weight:

Example 1

3.4 parts of 1-amino-5-benzoylaminoanthraquinone and 4 parts of 2-phenyl-4-chloro-7.8-phthaloyl quinazoline of the following constitution:

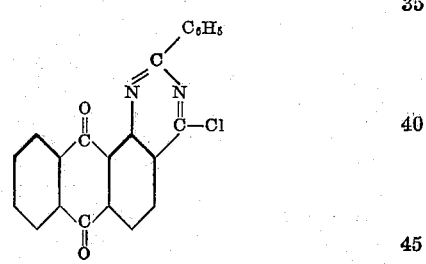

are heated to boiling in 100 parts of nitrobenzene and kept at this temperature until the removal of hydrozen chloride has ceased. On filtering by suction the orange colored reaction product at room temperature it is rinsed with pyridine and methanol and dried. It dyes vegetable fiber from a reddish-brown vat orange shades.

The 2-phenyl-4-chloro-7.8-phthaloylquinazoline is obtained by treating 1-benzoylaminoanthraquinone-2-carboxylic acid amide with thionylchloride in nitrobenzene. It crystallizes in the form of brownish-yellow needles.

*Example 2*

By the action of an excess of oxalyl chloride on a suspension of 1-aminoanthraquinone-2-carboxylic acid amide in nitrobenzene, whereby the oxalyl chloride reacts as phosgene, carbon monoxide being eliminated, the dioxyquinazoline of the following constitution is obtained after a brisk reaction:

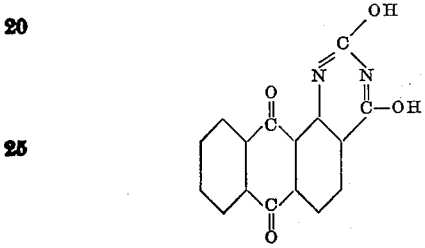

It is obtained in the form of yellow leaflets when recrystallized from pyridine. On heating it in nitrobenzene with a mixture of phosphorus oxychloride and phosphorus pentachloride it is converted into the 2.4-dichloro-7.8-phthaloyl quinazoline.

5 parts of 1-aminoanthraquinone and 3.3 parts of 2.4-dichloro-7.8-phthaloyl quinazoline are heated to 210° C. in 150 parts of nitrobenzene until hydrogen chloride is no longer split off. The cake obtained on filtering off the reaction product by suction at 120° C. is stirred several times in nitrobenzene, whereupon, after the removal of the mother liquor, it is dried in vacuo at 130° C. The dyestuff thus obtained is practically insoluble in organic solvents and dyes cotton from a reddish-brown vat orange shades.

*Example 3*

2-aminoanthraquinone-3-carboxylic acid is converted into the anhydride of the 2-benzoylaminoanthraquinone-3-carboxylic acid by the action of benzoyl chloride in nitrobenzene. By heating it to about 100° C. in a 10-20% ammonia solution it is transformed into the 2-benzoylaminoanthraquinone-3-carboxylic acid amide according to the following equation:

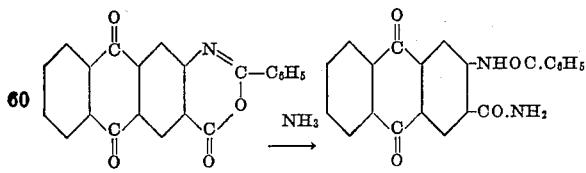

On boiling with dilute soda lye in pyridine water, the acid amide is transformed into the 2-phenyl-4-hydroxy-6.7-phthaloyl-quinazoline from which the 2-phenyl-4-choloro-6.7-phthaloyl quinazoline is obtained by the action of phosphorous pentachloride. The chloroquinazoline may also directly be obtained from the 2-benzoylaminoanthraquinone-3-carboxylic acid amide, e. g. by treating it in nitrobenzene with phosphorus pentachloride.

In a similar manner a great number of phthaloyl quinazolines which contain other substituents in 2-position may be obtained when replacing the benzoyl chloride by other acid chlorides.

5 parts of 2-phenyl-4-chloro-6.7-phthaloyl quinazoline and 4 parts of 4-amidoanthraquinone-2.1(N)-1'.2'-(N)-5'-chlorobenzacridone are heated to boiling in 100 parts of phenol until the removal of hydrochloric acid has ceased. When the reaction is complete the mixture is cooled to 110° C. and diluted with 50 parts of pyridine. On filtering with suction at 80° C., rinsing with pyridine and drying, a black crystal powder is obtained which is soluble in sulfuric acid giving an orange-yellow color. When pouring into water it separates in green flakes. The dyestuff dyes cotton from a brown vat green shades.

Similar dyestuffs are obtained in an analogous manner when carrying out the reaction with other 4-amidoanthraquinone-acridones, for instance, with 4-amidoanthraquinone-2.1(N)-1'.2'(N)-6'-chlorobenzacridone, 4-amidoanthraquinone-2.1(N)-1'.2'(N)-benzacridone, 4-amidoanthraquinone-2.1(N)-1'.2'(N)-naphthacridone.

The dyestuffs obtained by the action of 4-amidoanthraquinone-2.1(N)-1'2'(N)-4'-chlorobenzacridone or 4-amidoanthraquinone-2.1(N)-1'.2'(N)-3'.5'-dichlorobenzacridone with 2-phenyl-4-chloro-6.7-phthaloyl quinazoline yield more bluish shades.

These quinazolyl derivatives can be satisfactorily purified by reprecipitating them from sulfuric acid, well crystallizing sulfates being obtained thereby.

*Example 4*

10 parts of pyridine are added to a suspension of 1 part of 2-phenyl-4-chloro-6.7-phthaloyl quinazoline in 2.5 parts of 25% dimethylamine. The whole is then heated to boiling, the 2-phenyl-4-dimethylamido-6.7-phthaloyl quinazoline being obtained in yellow crystals. On cooling and diluting with methanol the reaction product is filtered with suction and dried. The dimethylamido derivative is soluble in glacial acetic acid with a yellow coloration and separates out on the addition of dilute hydrochloric acid as the hydrochloride.

*Example 5*

2.5 parts of the chloride which is obtained from 2-(2'.5'-dichlorobenzoyl)-aminoanthraquinone-3-carboxylic acid amide of the following formula:

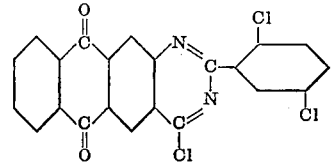

are heated to boiling in 20 parts of phenol with 2 parts of β-aminoanthraquinone until the reaction is complete. The dyestuff which separates out on diluting the reaction mixture with ethyl alcohol dyes cotton from a yellow-brown vat clear greenish-yellow shades.

*Example 6*

4 parts of 1-amino-5-benzoylaminoanthraquinone and 4 parts of 2-(para-methoxyphenyl)-4-chloro-6.7-phthaloyl quinazoline are heated to 180° C. in 40 parts of phenol until the evolution of hydrochloric acid has terminated. The melt is diluted with 40 parts of pyridine and filtered with suction at 100° C. This compound can be purified by boiling with pyridine. It dyes vegetable fiber from the vat orange-red shades.

Example 7

To a solution of 2.5 parts of dehydrothiotoluidine in 50 parts of pyridine there are added 2.8 parts of 2-phenyl-4-chloro-6.7-phthaloyl quinazoline; the whole is then heated to boiling for 30 minutes while refluxing. Part of the dyestuff formed already separates while heating; on diluting with methanol and cooling it is sucked off, rinsed and dried. The orange-yellow-colored leaflets thus obtained are soluble in sulfuric acid with a yellow coloration, cotton being dyed from a yellowish-brown vat greenish-yellow shades.

Example 8

26.7 parts of anthraquinone-2-amido-3-carboxylic acid and 33 parts of para-toluic acid chloride are transformed into the lactone of the anthraquinone-2-toluylamino-3-carboxylic acid by heating to 210°. The formation of the lactone being finished the melt is cooled to 120°, whereupon ammonia is introduced. The lactone is transformed thereby into the difficultly soluble carbonamide which, on sucking off, and removing the adhering nitrobenzene is transformed into the hydroxyquinazoline as described in Example 1.

The CH$_3$-group attached to the benzene nucleus is transformed into the carboxylic acid group by oxidation with bichromate in a sulfuric acid solution.

By heating the hydroxy quinazoline carboxylic acid thus obtained with the twofold quantity of phosphorus pentachloride in trichlorobenzene the following dichloride is obtained:

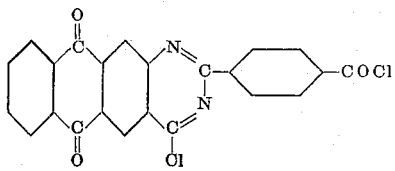

Into 50 parts of nitrobenzene of 170° C. there are introduced 2.2 parts of the above-described product and 3.4 parts of 1-aminoanthraquinone; the whole is then heated for 12 hours to boiling. Evolution of hydrochloric acid being finished, the hot solution is sucked off, rinsed with nitrobenzene and methanol and then dried. Vegetable fiber is dyed on oxidation from a brown vat reddish-yellow shades.

Example 9

2-hydroxyl-4-phenyl-6.7-phthaloyl quinazoline is obtained by heating 2-amino-3-benzoylanthraquinone in urethane in the presence of zinc chloride. On heating with phosphorus pentachloride the weakly yellowish colored hydroxy compound yields the nearly colorless 2-chloro-4-phenyl-6.7-phthaloyl quinazoline.

6.5 parts of the 2-chloro-4-phenyl-6.7-phthaloyl quinazoline thus formed are heated to boiling together with 6 parts of 4-aminoanthraquinone-2.1(N)-1'.2'(N)-5'-chlorobenzacridone in 120 parts of phenol until the evolution of hydrogen chloride has ceased. The further working up is carried out as described in Example 3. The olive colored crystals are difficultly soluble in organic solvents. By diluting the sulfuric acid solution with water the dyestuff is obtained in a pure state as well crystallizing sulfate; it dyes cotton from the vat green shades.

Example 10

20 parts of 2-phenyl-4-chloro-5.6-phthaloyl quinazoline (obtainable from the 2-aminoanthraquinone-1-carboxylic acid) and 20 parts of 4-amino - 3'.5' - dichloroanthraquinone - 2.1(N) - 1'.2'(N)-benzacridone are heated to boiling together with 1500 parts of nitrobenzene until the evolution of hydrochloric acid has ceased. The dyestuff separated during the reaction in a well crystallized form is sucked off at 100° C., rinsed with nitrobenzene and dried. It dyes cotton from a Bordeaux red vat bluish-grey shades.

Similar dyestuffs are obtained when employing other 4-aminoanthraquinone acridones, for instance, the 4-amino-4'(or 5' or 6')-chloroanthraquinone-2.1(N) 1'2'(N)-benzacridones or the 4-aminoanthraquinone-2.1(N)-1'.2' (N)-naphthacridones.

We claim:

1. 6.7-phthaloyl quinazolines which contain a phenyl group in 2-position and an aminoanthraquinone-benzacridone radical in 4-position.

2. 2-phenyl-6.7-phthaloyl quinazolines containing in 4-position the radical of the 4-aminoanthraquinone-2.1(N)-1'.2'(N)-5' - chlorobenzacridone.

3. Phthaloyl quinazolines selected from the group consisting of 2-aryl-4-substituted amino, 2.4-disubstituted amino and 4-aryl-2-substituted amino-phthaloyl quinazolines, in which the substituent of the substituted amino group is a vattable paraquinoidic radical.

4. 2-phenyl 6.7-phthaloyl quinazolines containing in the 4-position a dehydrothiotoluidine radical.

5. Phthaloyl quinazolines which contain at least one substituted amino group attached to a carbon atom of the heterocyclic nucleus in which the substituent of the substituted amino group is a vattable para-quinoidic radical.

6. 6.7-phthaloyl quinazolines which contain at least one substituted amino group attached to a carbon atom of the heterocyclic nucleus in which the substituent of the substituted amino group is a vattable para-quinoidic radical.

7. Phthaloyl quinazolines which contain a phenyl radical in 2-position and a substituted amino group in 4-position, the substituent of the substituted amino group being a vattable para-quinoidic radical.

8. 6.7-phthaloyl quinazolines which contain a phenyl radical in 2-position and a substituted amino group in 4-position, the substituent of the substituted amino group being a vattable para-quinoidic radical.

FRITZ BAUMANN.
HEINZ WERNER SCHWECHTEN.